UNITED STATES PATENT OFFICE.

GEORGE BECK, OF CHARLOTTE, NEW YORK.

IMPROVED BEVERAGE.

Specification forming part of Letters Patent No. 55,983, dated July 3, 1866.

*To all whom it may concern:*

Be it known that I, GEORGE BECK, of Charlotte, in the county of Monroe and State of New York, have invented a new and Improved Beverage, which I denominate "Soda-Cream;" and I do hereby declare that the following is a full and exact description thereof.

It is the object of my improvement to prepare already fermented wine, or equivalent fermented liquid, in such a manner that it may be brought to a state of secondary fermentation after the primary fermentation has passed, and to so confine it as to exclude it from the air and allow it to discharge by the pressure of its own produced gas, to produce an effervescent or creamy beverage.

To accomplish this I take the ingredients in about the following proportions: Wine or equivalent liquid, one and a half gallon; sugar, four and a half pounds; water, sufficient to make the whole five gallons.

The proportions may be varied somewhat as the circumstances of the case may require.

The compound is mixed in a suitable vat or tub till the sugar is dissolved. Orris-root and cloves, or other flavoring-extract, may be added, according to the taste. When this is accomplished the compound is placed in a strong, air-tight cask or other vessel, but so as not to quite fill it, leaving a little space for the collection of produced gas at the top. In ten or twelve days fermentation will have set in and the beverage will be ready for use.

The process of fermentation may be brought on sooner by the addition of a little already fermenting liquid.

The natural gas produced by the fermentation rises to the top of the inclosing cask or vessel, and by its constant pressure forces the liquid through the faucet, when the latter is open, without the admission of air, which is always necessary to exclude.

As it is designed that the beverage shall be used before the process of fermentation has passed, it is obvious that the gas produced will be always sufficient to discharge the liquid with force, and will therefore produce it in the glass in that effervescent and creamy state that gives life to the beverage and makes it pleasing to the taste.

The advantage of this process is manifest. The principal object is, first, to so treat the liquid that has already passed the primary fermentation that a secondary fermentation may take place; and, second, to so confine the compound during the process of the secondary fermentation as to exclude it from the air and allow it to be discharged by the force of its own produced gas in an effervescent state.

I am not aware that wines or other similar liquids that have passed through the primary fermentation have ever before been so treated. The simple ingredients herein named produce this result. In this manner I am enabled to treat old and mellowed wines so as to produce an effervescing draft.

What I claim as my invention, and desire to secure by Letters Patent, is—

The production of a beverage by the mixture of wine or other similar fermented liquor with water in the proportions set forth, or thereabout, and the addition of sugar to produce a secondary fermentation, to be conducted and continued in a close vessel, so as to retain the gases produced thereby for excluding the air and expelling the beverage in an effervescing state, substantially as and for the purpose herein specified.

In witness whereof I have hereunto signed my name in the presence of two subscribing witnesses.

GEO. BECK.

Witnesses:
R. F. OSGOOD,
J. A. DAVIS.